US008042770B2

(12) United States Patent
Martin et al.

(10) Patent No.: US 8,042,770 B2
(45) Date of Patent: Oct. 25, 2011

(54) STRUCTURAL ELEMENT, METHOD FOR PRODUCING SUCH A STRUCTURAL ELEMENT, AND AIRCRAFT HAVING SUCH A STRUCTURAL ELEMENT

(75) Inventors: Alexander Martin, Bremen (DE);
Arthur Tillich, Hamburg (DE);
Frederik Pellenkoft, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 698 days.

(21) Appl. No.: 11/773,853

(22) Filed: Jul. 5, 2007

(65) Prior Publication Data

US 2008/0006741 A1    Jan. 10, 2008

(30) Foreign Application Priority Data

Jul. 7, 2006   (DE) .......................... 10 2006 031 436

(51) Int. Cl.
*B64C 1/00* (2006.01)
*B32B 3/00* (2006.01)
*E04C 2/38* (2006.01)
(52) U.S. Cl. .......................... 244/133; 428/57; 52/801.1
(58) Field of Classification Search .................. 244/119, 244/131, 132, 133; 52/801.1; 156/245, 307.1, 156/307.7; 428/57
See application file for complete search history.

(56) References Cited

U.S. PATENT DOCUMENTS

| | | | | |
|---|---|---|---|---|
| 3,058,704 A * | 10/1962 | Bergstedt | .................... | 244/119 |
| 4,673,606 A * | 6/1987 | Unden et al. | .................. | 428/138 |
| 5,043,128 A | 8/1991 | Umeda | | |
| 5,132,070 A | 7/1992 | Paul et al. | | |
| 5,320,696 A | 6/1994 | McConnell et al. | | |
| 5,417,385 A * | 5/1995 | Arnold et al. | ................. | 244/1 A |
| 5,429,326 A * | 7/1995 | Garesche et al. | ............. | 244/133 |
| 5,468,327 A | 11/1995 | Pawlowicz et al. | | |
| 5,866,272 A * | 2/1999 | Westre et al. | ................. | 428/593 |
| 5,951,800 A * | 9/1999 | Pettit | ............................. | 156/157 |
| 6,114,050 A * | 9/2000 | Westre et al. | ................. | 428/608 |
| 6,479,124 B1 | 11/2002 | Porte et al. | | |
| 6,648,273 B2 * | 11/2003 | Anast | ............................ | 244/119 |
| 6,736,919 B1 | 5/2004 | Roebroeks | | |
| 7,052,573 B2 * | 5/2006 | Pham et al. | ................... | 156/286 |
| 7,115,323 B2 * | 10/2006 | Westre et al. | ................. | 428/593 |
| 7,560,152 B2 * | 7/2009 | Rajabali et al. | ................ | 428/57 |
| 2003/0168555 A1 * | 9/2003 | Livi et al. | ...................... | 244/132 |
| 2006/0147704 A1 * | 7/2006 | Pham et al. | ................... | 428/332 |

FOREIGN PATENT DOCUMENTS

DE    42 08 670 A1    9/1993

(Continued)

OTHER PUBLICATIONS

PCT International Search Report and Written Opinion, PCT/EP2009/051985, Jul. 27, 2009, 22 Pages.

(Continued)

*Primary Examiner* — Tien Dinh
*Assistant Examiner* — Joseph W Sanderson
(74) *Attorney, Agent, or Firm* — Fenwick & West LLP

(57) ABSTRACT

A multilayer structural element, such as a skin panel for an aircraft fuselage, comprises a plurality of metal webs and a plurality of fiber webs arranged as layers in a sandwich structure, where the metal webs of neighbouring layers form stepped connecting regions. A material strip is provided on an outer surface of the sandwich structure for at least partially covering an outlying connecting region, and the material strip enables the placement of rivets at uniform spacing for fastening a structure to the structural element.

17 Claims, 4 Drawing Sheets

(B-B)

FOREIGN PATENT DOCUMENTS

| | | |
|---|---|---|
| DE | 43 42 575 A1 | 4/1995 |
| DE | 101 61 240 C1 | 7/2003 |
| DE | 601 05 084 T2 | 8/2005 |
| DE | 10 2005 027 879 A1 | 12/2006 |
| EP | 0 281 130 A2 | 9/1988 |
| EP | 0 514 718 A1 | 11/1992 |
| EP | 1 894 706 A1 | 3/2008 |
| WO | WO 92/13706 A | 8/1992 |
| WO | WO 97/34763 A1 | 9/1997 |
| WO | WO 2005/032805 A1 | 4/2005 |

OTHER PUBLICATIONS

Office Action cited in German Application No. 10 2008 010 228.8, Oct. 2, 2008, 5 Pages.

Milwich, M., et al., "Herstellung Von Faserverstarktem Thermoplastischem Halbzeug Durch Pultrusion," Institut fur Textill—und Verfahrenstechnik Denkendorf, 2001, 6 Pages, With English Abstract.

\* cited by examiner (A-A)

(C)

(D)

(B-B)

STRUCTURAL ELEMENT, METHOD FOR PRODUCING SUCH A STRUCTURAL ELEMENT, AND AIRCRAFT HAVING SUCH A STRUCTURAL ELEMENT

This application claims the right of priority based on German application serial no. 10 2006 031 436.0, filed Jul. 7, 2006, which is incorporated by reference in its entirety.

FIELD OF THE INVENTION

The invention relates to a structural element, in particular to a skin panel for an aircraft fuselage, a method for producing such a structural element, and an aircraft having such a structural element.

BACKGROUND OF THE INVENTION

Aircraft fuselages have a multiplicity of individual skin panels which are interconnected. Known skin panels are made of the material Glare®, and are composite materials made from metal webs and fiber webs which are arranged as in a sandwich in a number of layers. The metal webs usually run in a longitudinal direction of the structural element. Neighbouring metal webs of a layer are interconnected in the region of their edge sections on the long sides by two-dimensional overlaps, the result being the construction of a multiplicity of stepped connecting regions. Neighbouring fiber webs of a layer abut against one another. The number of the metal webs and/or fiber webs can be increased for the purpose of reinforcing the skin panels in the regions of the rear structure such as frames.

These skin panels of composite type have the disadvantage that riveting in a circumferential direction is restricted by outlying connecting regions, since riveting according to specification requires the rivets to be placed at a certain minimum edge spacing relative to the longitudinal edges of the outlying edge sections, and requires them to exhibit a specific rivet pitch. As a result, the coordination between the construction of the skin panel and/or the connections of the metal webs and the rear structure such as the frames becomes very complicated and inflexible for changes. In particular, problems in attaining pressuretight connection arise in the transverse seam region. The minimum edge spacings and the rivet pitch can certainly be influenced by a targeted mixed riveting, that is to say the use of rivets with two different stringers, but the multiplicity of rivets with various diameters increases the failure rate in production.

SUMMARY OF THE INVENTION

It is an object of the present invention to provide a structural element, in particular for an aircraft fuselage, which permits a flexible arrangement of the rear structure, and pressuretight transverse seam regions, a method for producing such a structural element, and an aircraft having such a structural element.

This object is achieved by means of a structural element, by a method for producing the structural element, and by an aircraft having the structural element.

A structural element according to the invention, in particular for an aircraft fuselage has a multiplicity of metal webs and fiber webs which are arranged as in a sandwich in a number of layers. Neighbouring metal webs of a layer respectively have a connecting region with mutually overlapping edge sections. According to the invention, at least one material strip, running in a circumferential direction of the structural element, for at least partially covering an outlying connecting region is provided on an outer surface averted from the inner surface of the structural part. The solution according to the invention has the advantage that there is no restriction in the riveting of the skin panels and/or of the rear structure such as transverse butt straps and frames, since the material strips in the region of the rear structure and/or of the transverse seam regions provide a material web which is continuous in a circumferential direction of the structural element. Mixed riveting between two stringers is thereby at least substantially reduced.

A material strip is preferably provided in each case for the purpose of partially covering a multiplicity of connecting regions arranged next to one another in a circumferential direction of the structural element.

The material strips can, in particular, be arranged in transverse seam regions and/or in frame regions.

The material strips are preferably set back from neighbouring outer surface sections of the respective metal web in such a way that the material strips and the neighbouring outer surface sections lie substantially in a plane, and thus the outer surface of the structural element is substantially flat.

In order to increase the local load bearing capacity of the skin panel, the material strips can be fastened at outlying metal web sections via at least one fiber web.

In one exemplary embodiment, the material strip is directly fastened by its edge region at the outlying metal web sections.

The at least one material strip and the metal webs preferably are made the same material, and may be made of aluminum, for example.

The fibers of the fiber webs are typically glass fibers.

A method according to the invention for producing such a structural element provides for the individual metal webs, fiber webs and the at least one material strip to be fired to form the structural element. According to the invention, before the metal webs and fiber webs are laid into a mold in a longitudinal direction of the structural element to be produced the at least one material strip is laid into the mold in a circumferential direction of the structural element to be molded, before the laying of the metal webs fiber webs optionally being laid at least partially in a longitudinal direction onto the at least one material strip.

A multiplicity of material strips are preferably laid next to one another into the mold in a longitudinal direction of the structural element to be produced for the purpose of respectively partially covering a transverse seam region and/or a frame region.

An aircraft according to the invention is provided with at least one structural element of sandwich type which has on an outer surface averted from an inner surface at least one material strip for at least partially covering an outlying connecting region of neighbouring metal webs.

Other advantageous embodiments of the invention are also disclosed herein.

DESCRIPTION OF PREFERRED EMBODIMENTS

Figure 1:
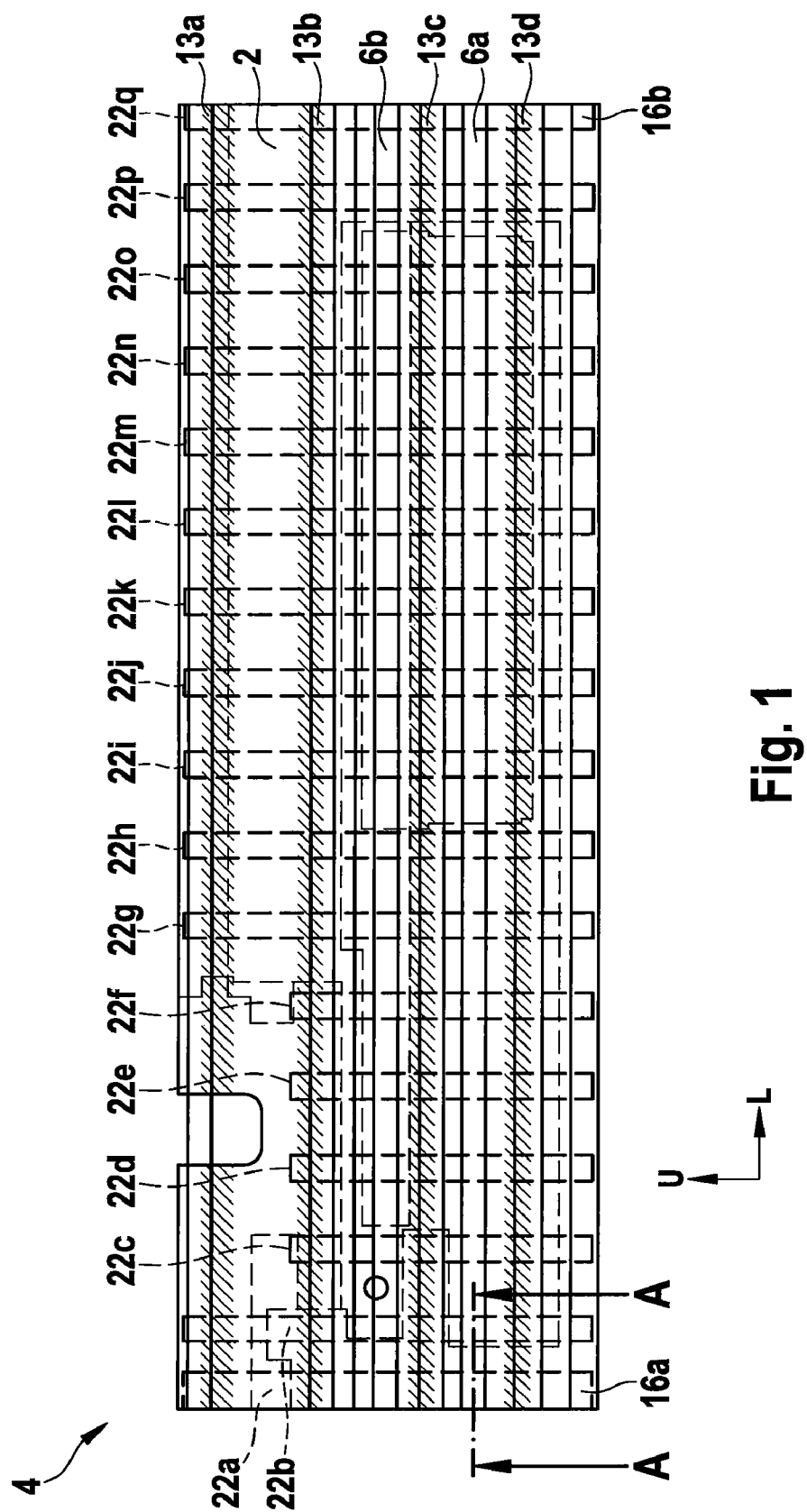
FIG. 1 shows an internal view of a structural element according to the invention.

FIG. 1 shows a view of an inner surface 2 of an exemplary structural element 4 of an aircraft. The structural element 4 is a skin panel of an aircraft fuselage, and has a substantially rectangular shape. As explained in more detail in FIGS. 2 to 5, the skin panel 4 has a multiplicity of metal webs 6a to 6f which run in a longitudinal direction L of the skin panel and are fired in a sandwich-like fashion with fiber webs 8a to 8d in an autoclave from a number of layers. The metal webs 6a to 6f preferably are made of aluminum, and the fibers of the fiber webs 8a to 8d are preferably glass fibers. However, other materials are also conceivable such as, for example, a metal alloy, carbon fiber or natural fibers. The neighbouring metal webs 6a to 6f of a layer are respectively interconnected in connecting regions 12a, 12b, 12c by overlapping of their neighbouring edge sections 10a to 10f, which are shown in FIG. 5 and extend in a longitudinal direction L of the skin panel 4. These connecting regions 12a, 12b, 12c, arranged offset from one another, respectively form a bonded seam region 13a to 13d, indicated by hatching in FIG. 1, in a longitudinal direction. The neighbouring fiber webs of the layers 8a to 8d bear against one another at their end faces. A detailed description of the sandwich-like construction of the skin panel 4 is given in FIGS. 2 to 5.

Arranged in a longitudinal direction L next to one another for the purpose of stabilizing the skin panel 4 in a transverse or circumferential direction U are a multiplicity of frames 14 (compare FIG. 3) which are not shown in FIG. 1 and which extend in a circumferential direction U of the skin panel 4.

In accordance with FIG. 1, a multiplicity of stringers (not shown) which are preferably bonded to the skin panel 4 are arranged next to one another on the inner surface 2 in a circumferential direction U of the skin panel 4 in order to stabilize the skin panel 4 in a longitudinal direction L.

For the purpose of connecting the skin panel 4 to other skin panels 4 in a circumferential direction U, the skin panel 4 has at its mutually averted end sections transverse seam regions 16a, 16b extending in a circumferential direction U. The connection in the transverse seam regions 16a, 16b is performed by means of transverse seam straps (not shown). The connection of the stringers of neighbouring skin panels by their ends is performed via in each case a stringer coupling 18, indicated by dots in FIG. 5, in the region of the transverse seam regions 16a, 16b.

A multiplicity of inventive material strips 22a to 22q illustrated by dashes are arranged at sections of an outer surface 20 of the skin panel 4 which are averted from the frames 14 and from the transverse seam regions 16a, 16b. The material strips 22a to 22q extend in a circumferential direction U of the skin panel 4 at most substantially over the entire length of the frame or of the transverse seam regions 16a, 16b, and in so doing inventively at least partially cover a multiplicity of radially outlying connecting regions 12c running in a longitudinal direction L of the skin panel 4 (compare FIG. 5). The material strips 22a to 22q can, however, also be arranged at other sections of the outer surface 20 such as, for example, in the region of a rivet. The material strips 22a to 22q preferably are made of the same material as the metal webs 6a to 6f.

Figure 2:
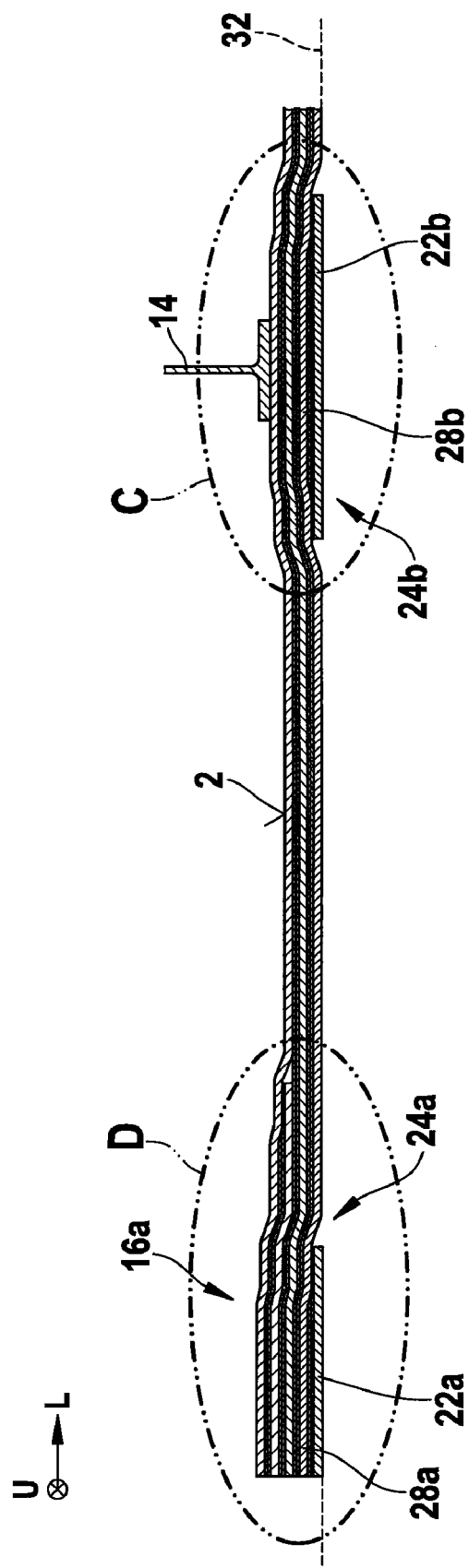
FIG. 2 shows a longitudinal section through the structural element from FIG. 1, along the line A-A.

FIG. 2 is a longitudinal section through the skin panel 4 from FIG. 1, along the line A-A, and represents the sandwich-like layered construction of the skin panel 4. In accordance with the enlarged illustrations in FIGS. 3 and 4, the skin panel 4 has three layers made from metal webs 6a, 6c, 6e, between which two fiber webs 8a, 8b and 8c, 8d are respectively arranged. Neighbouring fiber webs 8a, 8b and 8c, 8d of a layer are interconnected by their fibers offset by 90°.

In accordance with FIG. 2, a material strip 22a, 22b running in a circumferential direction U is respectively arranged on the outer surface 20 in the region of a frame 14 and in the transverse seam region 16a, as a result of which the thickness of the skin panel 4 in this region is correspondingly increased. The material strips 22a, 22b are respectively arranged in a stepped deformation 24a, 24b, resulting from production and offset radially inwards, of the skin panel 4, and are fired together with the metal web sections 28a, 28b carrying them or covered by them. In accordance with FIGS. 3 and 4, two fiber webs 26a, 26b or 26c, 26d arranged as in a sandwich and extending in a circumferential direction U are provided for the purpose of increasing the load bearing capacity between in each case a middle section 21a, 21b of the material strip 22a, 22b. The material strips 22a, 22b are directly connected to the stepped surfaces 25a, 25b and 25c, facing them, of the deformation 24a, 24b in edge surfaces 23a, 23b and 23c laterally adjoining the respective middle sections 21a, 21b and extending in a circumferential direction U. The connection of the edge surfaces 23a to 23c with the respective stepped surface 25a to 25c is performed in each case by means of an adhesive and therefore constitutes a metal-to-metal bonding. The maximum depth of the deformation 24a, 24b in a radial direction corresponds substantially to the thickness or wall thickness of the material strips 22a, 22b with the fiber webs 26a, 26b and 26c, 26d, and has the effect that the material strips 22a, 22b lie in a plane 32 with neighbouring metal web sections 30a, 30b and 30c, the outer surface 20 therefore being of virtually flat construction. In accordance with the outlying deformation 24a, 24b, the inner surface 2 is offset radially inwards in this skin panel section.

Figure 3:
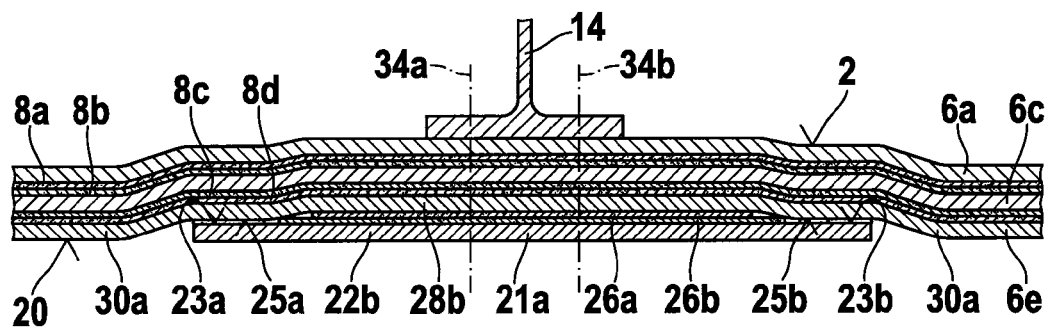
FIG. 3 shows an illustration of the detail from FIG. 2, in the frame region.

A frame 14 shown by way of example in FIG. 3 is preferably of T-shape construction and fastened on the skin panel 4 by means of a multiplicity of rivets 34a, 34b. The rivets 34a, 34b are guided through rivet holes (not illustrated) running through the individual layers and the respective material strip 22b, bearing in the process with their head (not illustrated) against the outer surface 20 of the respective material strip 22b. That is to say, the rivets 34a, 34b are guided through the rivet hole from outside.

Figure 4:
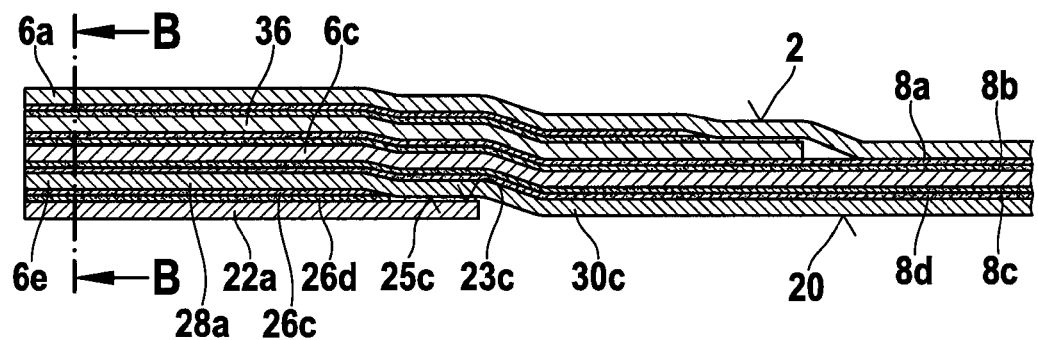
FIG. 4 shows an illustration of the detail from FIG. 2, in the transverse seam region.
Figure 5:
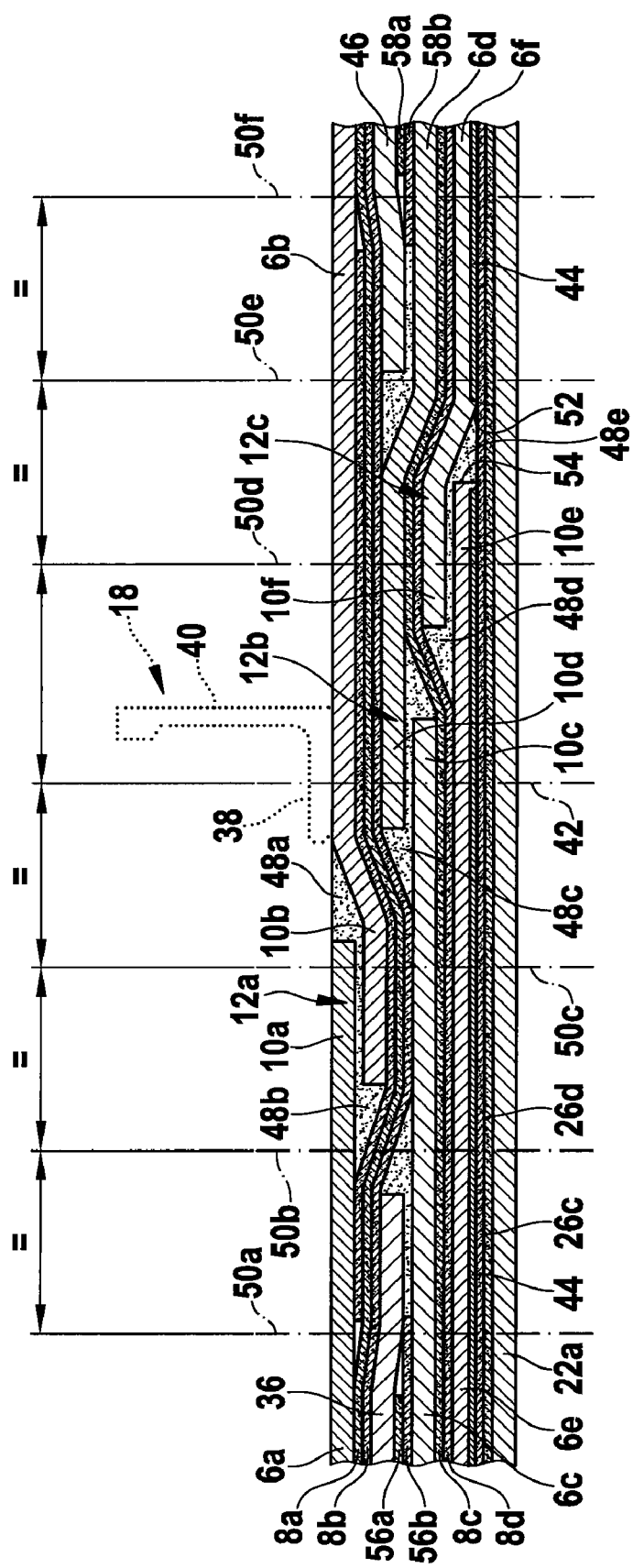
FIG. 5 shows a cross section through the illustration of the detail from FIG. 4, along the line B-B.

FIG. 4 shows an illustration of a detail of the transverse seam region 16a from FIG. 2. Illustrated in addition to the three metal web layers and three fiber web layers is a sheet-shaped compensating element 36 which is explained in more detail with the aid of the cross sectional illustration in FIG. 5.

FIG. 5 is a section through the skin panel 4 along the line B-B in FIG. 4. As an aid to a better understanding of the invention, a stringer coupling 18 arranged on the inner surface 2 and serving to connect the respective stringers of neighbouring skin panels 4 by their ends is indicated by dots.

The stringer coupling 18 is preferably provided in an L-shaped fashion with a short limb 38 resting in two dimensions on the inner surface 2, and a long limb 40 extending at right angles from the short limb 38. The stringer coupling 18 is fastened on the skin panel 4 by means of rivets 42, indicated by dots and dashes, running through the short limb 38, the layers of the skin panel 4 and the material strip 22a.

The connecting regions 12a to 12c are formed by connections of neighbouring metal webs 6a to 6f. The neighbouring metal webs 6a, 6b and 6c, 6d and 6e, 6f overlap one another in their edge sections 10a, 10b and 10c, 10d and 10e, 10f, the edge section 10b, 10d, 10f of one metal web 6b, 6d, 6f being offset by the wall thickness of the neighbouring metal web 6a, 6c, 6e, and being brought to overlap in two dimensions with the edge section 10a, 10c, 10e of the neighbouring metal web 6a, 6c, 6e such that the neighbouring metal webs 6a, 6b and 6c, 6d and 6e, 6f are duplicated in their connecting regions 12a, 12b, 12c and a stepped design results. The metal webs 6a to 6f of the individual metal web layers are spaced apart from one another via the fiber webs 8a to 8d. The metal webs 6e, 6f of the outlying layer are provided with a clad coating 44 as protection against corrosion.

A number of compensating elements 36, 46 in the form of metal plates, preferably made from the same material as the metal webs 6a to 6f, are laid in sections between two metal webs 6a, 6c and 6b, 6d for the purpose of compensating differences in thickness and/or the number of layers to be formed upon the duplication of the edge sections 10a to 10f of neighbouring metal webs 6a to 6f. The compensating elements 36, 46 are embedded in the skin panel 4 via fiber webs 56a, 56b and 58a, 58b.

Because of the duplication of the edge sections 10a to 10f of the neighbouring metal webs 6a to 6f, a multiplicity of wedge-shaped cavities 48a to 48e are formed at the end faces of the edge sections 10a to 10f in a circumferential direction U of the skin panel 4 which are filled up with an adhesive and in each case extend from a deflecting edge 52 of the step-like edge section 10f of one metal web 6f to an end face 54, facing the deflecting edge 52, of the flat edge section 6e of the neighbouring metal web 6f.

The material strips 22a, 22b are arranged at least in sections indirectly via the fiber webs 26a, 26b on the outlying metal webs 6e, 6f having the clad coating 44. The material strips 22a, 22b run in a circumferential direction U of the skin panel 4 and at least partially cover the connecting regions 12c and, in particular, the cavities 48e. The overlapping has the advantage that it is possible, starting from the position of the rivets 42 for fastening the stringer coupling 18, to position further necessary rivets 50a to 50f, for connecting the skin panels 4 via transverse seam straps in a circumferential direction U of the skin panel 4 or for fastening the rear structure, in a fashion independent of minimum edge spacings which are to be observed from the deflecting edges 52 or the end faces 54, since owing to the material strips 22a, 22b the outlying cavities 48e are partially closed in the region of the rivets 42, 50a to 50f to be placed, and the rivets 42, 50a to 50f can therefore run through the cavities 48e. It is thereby possible to place the rivets 42, 50a to 50f with uniform diameters at uniform spacings from one another such that it is both possible for the neighbouring skin panels 4 to be interconnected in a pressuretight fashion, and the mixed riveting mentioned at the beginning to be eliminated.

The material strips 22a to 22q can be positioned in such a way that they serve as reinforcing elements such that, in combination with the inventive material strips 22a to 22q, the number of the metal web layers and the fiber web layers is not increased by comparison with the initially described structural elements without material strips 22a to 22q, but with reinforcing elements integrated between the metal and fiber webs.

In the case of an exemplary inventive method for producing the previously described skin panel 4, the material strips 22a to 22q are firstly laid into a mold in a circumferential direction U of the skin panel 4 to be produced. Two fiber webs 26a, 26b and 26c, 26d are optionally then laid onto the material strips 22a to 22q. Subsequently, the metal webs 6a to 6f and the fiber webs 8a to 8d are laid in layers into the mold in a longitudinal direction L of the skin panel 4 to be formed, in which case they cross the material strips 22a to 22q at least partially with their connecting regions 12a to 12c. It is also possible in addition when laying the metal webs 6a to 6f and the fiber webs 8a to 8d in layered fashion to lay compensating elements 36, 46 for compensating differences in wall thickness and/or reinforcing elements for reinforcing highly loaded regions of the skin panel 4. After the laying of the metal webs 6a to 6f, the fiber webs 8a to 8d, the compensating elements 36, 46 and/or the reinforcing elements, the mold is moved into an autoclave, and the individual layers are fired in a specific application of pressure to form the skin panel 4. Subsequently, the stringers are laid onto the inner surface 2 of the skin panel 4 and fired with the skin panel 4 in a renewed autoclave process.

In an alternative, the material strips 22a to 22q are subsequently applied to the skin panel 4.

A multilayer structural element is disclosed, in particular a skin panel for an aircraft fuselage, having a multiplicity of metal webs and fiber webs which are arranged in a number of layers, neighbouring metal webs of a layer respectively forming a stepped connecting region, and a material strip being provided for at least partially covering an outlying connecting region in a circumferential direction of the structural element on an outer surface averted from the inner surface of the structural element.

| List of reference numerals | |
|---|---|
| 2 | Inner surface |
| 4 | Skin panel |
| 6a to 6f | Metal web |
| 8a to 8d | Fiber web |
| 10a to 10f | Edge section |
| 12a to 12c | Connecting region |
| 13a to 13d | Bonded seam region in longitudinal direction |
| 14 | Frame |
| 16a, 16b | Transverse seam region |
| 18 | Stringer coupling |
| 20 | Outer surface |
| 21a, 21b | Middle section |
| 22a to 22q | Material strip |
| 23a, 23b, 23c | Edge surfaces |
| 24a, 24b | Deformation |
| 25a, 25b, 25c | Stepped surface |
| 26a to 26d | Fiber web |
| 28a, 28b | Metal web section |
| 30a, 30b, 30c | Metal web section |
| 32 | Plane |
| 34a, 34b | Rivet |
| 36 | Compensating element |
| 38 | Short limb |
| 40 | Long limb |
| 42 | Rivet |
| 44 | Clad coating |
| 46 | Compensating element |
| 48a to 48e | Cavity |
| 50a to 50f | Rivet |
| 52 | Deflecting edge |
| 54 | End face |
| 56a, 56b | Fiber web |
| 58a, 58b | Fiber web |

What is claimed is:

1. A structural element, comprising:
   a plurality of metal sheets;
   a plurality of fiber sheets, wherein the plurality of metal sheets and the plurality of fiber sheets are arranged as layers of a sandwich structure, the sandwich structure having a plurality of connecting regions disposed along a face of the sandwich structure and oriented in a first direction across the face of the sandwich structure, the plurality of connecting regions corresponding to mutually overlapping edge sections of neighboring metal sheets of the plurality of metal sheets; and a plurality of material strips placed on the face of the sandwich structure and which traverse across the plurality of connecting regions, wherein each material strip is substantially narrower than the connecting regions along the first direction.

2. The structural element of claim 1, wherein the plurality of material strips partially cover the plurality of connecting regions.

3. The structural element of claim 1, wherein at least one of the material strips is arranged at a region of the sandwich structure that corresponds to at least one of a transverse seam region and frame region.

4. The structural element of claim 1, wherein the material strips are arranged in a deformation formed during the production of the structural element.

5. The structural element of claim 1, wherein at least one of the plurality of fiber sheets is arranged between sections of two metal sheets of the plurality of metal sheets.

6. The structural element of claim 5, wherein the material strips are directly connected to a plurality of stepped surfaces of a deformation which face the material strips.

7. The structural element of claim 1, wherein the material strips are made of the same material as the plurality of metal sheets.

8. The structural element of claim 1, wherein the material strips are made of aluminum.

9. The structural element of claim 1, wherein the plurality of fiber sheets are made of glass fibers.

10. The structural element of claim 1, wherein the material strips comprise reinforcing elements.

11. The structural element of claim 1, wherein the structural element is a skin panel for an aircraft fuselage.

12. The structural element of claim 1, wherein the material strips are oriented in a second direction that is perpendicular to the first direction.

13. The structural element of claim 12, wherein the material strips are adapted to receive rivets at a uniform spacing in the second direction to fasten a structure to the structural element.

14. The structural element of claim 12, wherein the first direction is a longitudinal direction and the second direction is a circumferential direction.

15. A method for producing a structural element comprising the steps of:
laying a plurality of material strips into a mold in a first direction;
laying, onto the plurality of material strips, layers of a plurality of metal sheets and a plurality of fiber sheets, wherein the layers are arranged as a sandwich structure, wherein the sandwich structure has a plurality of connecting regions corresponding to mutually overlapping edge sections of neighboring metal sheets of the plurality of metal sheets, the connecting regions disposed along a face of the sandwich structure that faces the material strips and oriented in a first direction across the face of the sandwich structure, wherein each material strip is substantially narrower than the connecting regions along the first direction; and
connecting the layers to the plurality of material strips.

16. The method of claim 15, wherein laying the plurality of material strips into a mold comprises laying at least one material strip of the plurality of material strips at a region that corresponds to at least one of a transverse seam region and a frame region.

17. An aircraft having a structural element, the structural element comprising:
a plurality of metal sheets;
a plurality of fiber sheets, wherein the plurality of metal sheets and the plurality of fiber sheets are arranged as layers of a sandwich structure, the sandwich structure having a plurality of connecting regions disposed along a face of the sandwich structure and oriented in a first direction across the face of the sandwich structure, the plurality of connecting regions corresponding to mutually overlapping edge sections of neighboring metal sheets of the plurality of metal sheets; and
a plurality of material strips placed on the face of the sandwich structure and which traverse across the plurality of connecting regions, wherein each material strip is substantially narrower than the connecting regions along the first direction.

* * * * *

UNITED STATES PATENT AND TRADEMARK OFFICE
CERTIFICATE OF CORRECTION

| | |
|---|---|
| PATENT NO. | : 8,042,770 B2 |
| APPLICATION NO. | : 11/773853 |
| DATED | : October 25, 2011 |
| INVENTOR(S) | : Alexander Martin et al. |

It is certified that error appears in the above-identified patent and that said Letters Patent is hereby corrected as shown below:

Col. 8, In claim 15, on line 6-7, delete text "in a first direction".

Signed and Sealed this
Sixth Day of March, 2012

David J. Kappos
*Director of the United States Patent and Trademark Office*